United States Patent
Ivan (10) Patent No.: US 9,784,419 B2
(45) Date of Patent: Oct. 10, 2017

(54) LIGHT CONVERSION MATERIALS BASED ON LUMINESCENT METAL ATOMIC NANOCLUSTERS

(71) Applicant: KONINKLIJKE PHILIPS N.V., Eindhoven (NL)

(72) Inventor: Marius Gabriel Ivan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/649,655

(22) PCT Filed: Nov. 29, 2013

(86) PCT No.: PCT/IB2013/060503
§ 371 (c)(1),
(2) Date: Jun. 4, 2015

(87) PCT Pub. No.: WO2014/087308
PCT Pub. Date: Jun. 12, 2014

(65) Prior Publication Data
US 2015/0300578 A1    Oct. 22, 2015

Related U.S. Application Data

(60) Provisional application No. 61/733,486, filed on Nov. 29, 2012.

(51) Int. Cl.
*C09K 11/58* (2006.01)
*F21K 2/00* (2006.01)
(Continued)

(52) U.S. Cl.
CPC .............. *F21K 9/56* (2013.01); *B01J 19/123* (2013.01); *C09K 11/025* (2013.01); *C09K 11/06* (2013.01);
(Continued)

(58) Field of Classification Search
CPC .. F21K 9/56; F21K 9/64; B01J 19/123; C09K 11/58; G02F 2001/133614
See application file for complete search history.

(56) References Cited

U.S. PATENT DOCUMENTS

2004/0217696 A1   11/2004   Kim et al.
2008/0246017 A1   10/2008   Gillies et al.
(Continued)

FOREIGN PATENT DOCUMENTS

CN   102121591   7/2011
CN   102373058   3/2012
(Continued)

OTHER PUBLICATIONS

"A Visible Light Photochemical Route to Silver-Epoxy Nanocomposites by Simultaneous Polymerization-Reduction Approach" Yagci et al, Polymer 49 (2008) p. 5195-5198.
(Continued)

*Primary Examiner* — Karabi Guharay (57) ABSTRACT

The invention provides a lighting device (1) comprising (i) a light source (10) configured to generate light source light (11), and (ii) a light converter (100) configured to convert at least part of the light source light (11) into visible converter light (121), wherein the light converter (100) comprises a polymeric host material (110) with light converter nanoparticles (120) embedded in the polymeric host material (110), wherein the polymeric host material (110) is based on radical polymerizable monomers, wherein the polymeric host material comprises a poly acrylate polymer and wherein the light converter nanoparticles (120) comprise Ag (silver) nanoparticles having mean dimensions below 3 nm.

20 Claims, 5 Drawing Sheets (51) Int. Cl.

| | |
|---|---|
| *F21K 99/00* | (2016.01) |
| *C09K 11/06* | (2006.01) |
| *H05B 33/14* | (2006.01) |
| *B01J 19/12* | (2006.01) |
| *C09K 11/02* | (2006.01) |
| *G02F 1/1335* | (2006.01) |
| *F21K 9/64* | (2016.01) |

(52) U.S. Cl.
CPC ............... *C09K 11/58* (2013.01); *F21K 9/64* (2016.08); *G02F 1/133603* (2013.01); *H05B 33/14* (2013.01); *B01J 2219/1203* (2013.01); *C09K 2211/1416* (2013.01); *C09K 2211/188* (2013.01); *G02F 2001/133614* (2013.01)

(56) References Cited

U.S. PATENT DOCUMENTS

| | | | |
|---|---|---|---|
| 2010/0029016 A1 | 2/2010 | Dickson et al. | |
| 2010/0123155 A1 | 5/2010 | Pickett et al. | |
| 2011/0018425 A1* | 1/2011 | De Cremer | C09K 11/02 313/483 |
| 2011/0068321 A1 | 3/2011 | Pickett et al. | |
| 2012/0150095 A1* | 6/2012 | Szycher | A61K 31/28 604/8 |

FOREIGN PATENT DOCUMENTS

| | | |
|---|---|---|
| WO | 03093328 A1 | 11/2003 |
| WO | 2009006707 A1 | 1/2009 |
| WO | 2011031871 A1 | 3/2011 |
| WO | WO-2011036446 A1 | 3/2011 |

OTHER PUBLICATIONS

"Photoluminescence From Nanosize Gold Clusters" Wilconon et al, Journal of Chemical Physics, vol. 108, No. 21, Jun. 1, 1998.

"Photostimulated Luminescence and Dynamics of Agl and Ag Nanoclusters in Zeolites" Chen et al, Physical Review, vol. 65, May 28, 2002.

"Light-Emitting Diodes Enchanced by Localized Surface Plasmon Resonance" Gu et al, Nanoscale Research Letters 2011 6:199.

"Ultraviolet Light Induced White light Emission in Ag and Eu Co-Doped Oxyflouride Glasses" Guo et al, Optics Express Aug. 30, 2010, vol. 18, No. 18.

First Office Action dated Jun. 8, 2016, China Application No. 201380072372.9 filed Nov. 29, 2013, 18 pages.

Third Office Action dated Jul. 5, 2017, China Patent Application No. 201380072372.9, LUM Reference No. 2012P01401WOCN, 15 pages.

\* cited by examiner

LIGHT CONVERSION MATERIALS BASED ON LUMINESCENT METAL ATOMIC NANOCLUSTERS

CROSS-REFERENCE TO PRIOR APPLICATIONS

This application is the U.S. National Phase application under 35 U.S.C. §371 of International Application No. PCT/IB2013/060503, filed on Nov. 29, 2013, which claims the benefit of U.S. patent application No. 61/733,486, filed Dec. 12, 2012. These applications are hereby incorporated by reference herein.

FIELD OF THE INVENTION

The invention relates to a lighting device comprising (i) a light source, configured to generate light source light, and (ii) a light converter, configured to convert at least part of the light source light into visible converter light. The invention further relates to a liquid crystal display device comprising a back lighting unit with such lighting device(s). Further, the invention relates to the light converter per se, as well as to a method for the production of such light converter.

BACKGROUND OF THE INVENTION

The use of nanoparticles in the form of metal nanoclusters in biotech applications is known in the art. US2010029016, for instance, describes a composition which is capable of being used for detection, comprising an encapsulated noble metal nanocluster. Methods for preparing the encapsulated noble metal nanoclusters, and methods of using the encapsulated noble metal nanoclusters are also described. The noble metal nanoclusters are preferably encapsulated by a dendrimer or a peptide. The encapsulated noble metal nanoclusters have a characteristic spectral emission. The spectral emission is varied by controlling the nature of the encapsulating material, such as by controlling the size of the nanocluster and/or the generation of the dendrimer. The emission is used to provide information about a biological state.

SUMMARY OF THE INVENTION

Phosphors are in general composite materials containing inorganic photoluminescent materials (ceramics), nanoparticles (quantum dots), and/or organic dyes which upon excitation release photons at longer wavelengths. The ideal phosphor has a good absorption at the excitation wavelength (often UV and/or blue) and a narrow emission band.

Organic dyes have a broad emission which extends into near infrared (NIR), therefore making them inefficient due to emission in a range outside the human eye sensitivity curve and energy losses as heat. Inorganic phosphors based on ceramics contain rare earth metals which makes them expensive. Nanoparticles such as quantum dots (QDs) possess properties which make them advanced luminescent materials to be used in solid state lighting.

Here below, nanoparticles, such as metal nanoclusters, that have the ability to give (visible) luminescence are also indicated as "light converter nanoclusters". They can e.g. be used in converting blue light to other colors, for obtaining high quality white light. For their applications in solid state lighting it may be necessary to embed the light converter nanoclusters in transmissive solid matrices such as polymers. Herein, we use the term "nanoparticles" also when we refer to "nanoclusters". Metal nanoclusters are fluorescent. Nanoclusters contain tens-hundreds of atoms, and are below 2.5-3.0 nm in diameter, whereas nanoparticles are >3-5 nm in diameter, even up to tens of nm, may not be luminescent at all. Hence, hereinbelow we use the term "nanocluster" or "metal nanocluster" or "light converter nano cluster" or "light converter metal nano cluster" or "atomic nanoclusters" when referring to noble metal, especially silver, nanoclusters having dimensions below 3 nm.

Hence, it is an aspect of the invention to provide a lighting device and/or light converter (for such lighting device), which preferably further at least partly obviate one or more of above-described drawbacks.

Nanoparticles (NPs) of noble metals (noble metal nanoclusters) may exhibit fluorescence when excited with light of an appropriate wavelength. It appears however that in general Ag NPs tend to have a higher absorption than other noble metal NPs. Fluorescence may especially occur when atomic nanoclusters are formed.

Herein, it is proposed to use fluorescent silver nanoparticles (i.e. light converter nano clusters) embedded in a matrix as phosphors for light conversion in light emitting diodes (LEDs). The phosphor may be obtained by UV-curing a mixture containing precursors to Ag NPs, photo initiators, stabilizing agents, and acrylate monomers with/without cross linking agents. The former additives lead to formation of Ag NPs upon exposure to ultraviolet (UV) light, while the latter two lead to formation of a (cross-linked) polymer which acts like a matrix/host for the Ag NPs. Other noble metals may be used as well (Au, Pt, Pd). Instead of an in situ preparation of the nanoparticles while creating the matrix, the nanoparticles may also be produced beforehand.

Hence, herein we provide a method for synthesis of a composite material to be used as phosphor to convert blue light into light at longer wavelengths. We developed a method to synthesize fluorescent Ag nanoparticles directly in a polymer, such as a polymer film, especially an acrylate film, following a photosynthetic route at room temperature. A mixture containing a noble metal salt, especially a silver salt, optionally a stabilizing agent for the Ag nanoparticles, a photo initiator, acrylate monomer, and optionally a cross-linking agent is cured by exposure to UV light. During exposure to UV (Ag) NPs are formed, and the (acrylate) monomer polymerizes, leading to a hard film which may be used as phosphor. The polymer chains are especially cross-linked by the cross-linking agent present in the mixture, ensuring that the film can be handled without the risk of breaking or damaging it.

As indicated above, alternatively the fluorescent (Ag) NPs may be obtained in a separate process in a suitable solvent, filtered, concentrated, and then added into a monomer which may contain a photo initiator (and cross-linking agent), followed by UV curing. This may advantageously ensure a higher concentration of emissive nanoparticles per unit volume of phosphor, and lead to thinner films which in some applications may be required.

Hence, in a first aspect the invention provides a lighting device comprising (a) a light source configured to generate light source light, and (b) a light converter configured to convert at least part of the light source light into visible converter light, wherein the light converter comprises a polymeric host material ("matrix") with light converter nanoparticles (i.e. "light converter nano clusters" or "metal nanoclusters") embedded in the polymeric host material, wherein the polymeric host material is especially based on radical polymerizable monomers, wherein the polymeric host material may comprise a poly acrylate polymer, and wherein the light converter nanoparticles comprise noble metal nanoparticles, especially Ag (silver) nanoparticles, having mean dimensions especially below 3 nm. These nanoparticles may also be indicated as atomic nanoclusters, as these nanoparticles may only include a limited number of (noble metal) atoms, such as about a few atoms to tens or hundreds of atoms (see also above).

This may be an optically interesting material, that does not suffer from above indicated drawbacks of prior art systems. Advantageously, the absorption and emission peaks may be shifted by controlling the environment of the NPs, as well as their size. Further advantages of fluorescent silver nano-clusters over existing solutions are abundance of materials, lower cost, and more environmentally friendly.

In a further aspect, the invention also provides such light converter per se. Hence, in a further aspect, the invention provides a light converter comprising a polymeric host material with light converter nanoparticles (i.e. light converter metal nano clusters) embedded in the polymeric host material, wherein the polymeric host material is especially based on radical polymerizable monomers, wherein the polymeric host material may especially comprise a poly acrylate polymer, and wherein the light converter nanoparticles comprise noble metal nanoparticles, especially Ag (silver) nanoparticles, having mean dimensions especially below 3 nm.

Especially, the light converter nanoparticles comprise Ag nanoparticles having mean dimensions below 2.5 nm. Especially under these conditions, efficient (luminescent) nano particles may be obtained. Here, the term "dimensions" refers to length, width and diameter. Herein, the noble metal nanoparticles are in general substantially spherical. Especially, 75% or more, such as at least 90% or more of the nanoparticles have mean dimensions below 3 nm, especially below 2.5 nm; especially mean dimensions equal to or below 2 nm. Especially, the light converter nanoparticles have mean dimension above 0.26 nm, such as above 1 nm. This may especially apply to at least 75%, or even more for at 90% of the nanoparticles. These dimensions may provide best results, while larger or smaller nanoparticles may lead to loss in efficiency. Especially, the light converter comprises 0.001-10 wt. % light converter nanoparticles relative to the total weight of the light converter, such as in the range of 0.1-5 wt. %.

In a specific embodiment, the light converter nanoparticles comprise Ag nanoparticles having mean dimensions below 2.5 nm, and the light converter comprises 0.001-25 wt. %, especially 0.001-10 wt. % light converter nanoparticles relative to the total weight of the light converter. This may especially provide good results in the sense of light yield.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting. In a further aspect, the invention especially provides a liquid crystal display device comprising a back lighting unit, wherein the back lighting unit comprises one or more lighting devices as described herein.

As indicated above, the lighting unit may be used as backlighting unit in an LCD display device. Hence, the invention provides also a LCD display device comprising the lighting unit as defined herein, configured as backlighting unit. The invention also provides in a further aspect a liquid crystal display device comprising a back lighting unit, wherein the back lighting unit comprises one or more lighting devices as defined herein.

Preferably, the light source is a light source that during operation emits (light source light) at least light at a wavelength selected from the range of 200-490 nm, especially a light source that during operation emits at least light at wavelength selected from the range of 400-490 nm, even more especially in the range of 440-490 nm. This light may partially be used by the light converter nanoparticles (see further also below). Hence, in a specific embodiment, the light source is configured to generate blue light. However, the light source may also be configured to provide only UV light or a combination of UV and blue light. Silver nanoclusters may absorb in the blue and also in the UV.

In a specific embodiment, the light source comprises a solid state LED light source (such as a LED or laser diode).

The term "light source" may also relate to a plurality of light sources, such as 2-20 (solid state) LED light sources. Hence, the term LED may also refer to a plurality of LEDs.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 540-570 nm. The terms "orange light" or "orange emission" especially relate to light having a wavelength in the range of about 570-600. The terms "red light" or "red emission" especially relate to light having a wavelength in the range of about 600-750 nm. The term "pink light" or "pink emission" refers to light having a blue and a red component. The terms "visible", "visible light" or "visible emission" refer to light having a wavelength in the range of about 380-750 nm.

The light converter can be seen as a (solid) entity, in general essentially comprising the polymeric host material and the light converter nanoparticles. The latter are in general essentially embedded in the polymeric host material. Hence, the light converter nanoparticles are enclosed by the polymeric host material. Especially, the light converter nanoparticles are dispersed in the polymeric host material. The polymeric host material is thus especially configured to be a polymer matrix (for the light converter nanoparticles embedded therein). The light converter may be encapsulated (see further below). The light converter (and also the light converter unit) may be a film, a layer, such as a self supporting layer, or a body.

The light converter can be configured as light exit window of the lighting device. Hence, in such embodiment, light from the light source and converter light (see further below) may emanate from the lighting device via and from the light converter (during use of the device). The light converter may also be configured in reflective mode. For instance, a light mixing chamber may comprise one or more wall(s) comprising the light converter (reflective mode) and/or an exit window comprising the light converter (transmissive mode).

The light converter (or more precisely the light converter nanoparticles) is (are) radiationally coupled to the light source (or, as indicated above, a plurality of light sources). The term "radiationally coupled" especially means that the light source and the light converter are associated with each other so that at least part of the radiation emitted by the light source is received by the light converter (and at least partly converted into luminescence). The term "luminescence" refers to the emission which emits the light converter nanoparticles emit upon excitation by the light source light of the light source. This luminescence is herein also indicated as converter light (which at least comprises visible light, see also below).

The light converter will in general also be configured downstream of the light source. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The device is especially configured to generate device light, which at least partly comprises the converter light, but which may optionally also comprise (remaining) light source light. For instance, the light converter may be configured to only partly convert the light source light. In such instance, the device light may comprise converter light and light source light. However, in another embodiment the light converter may also be configured to convert all the light source light.

Hence, in a specific embodiment, the lighting device is configured to provide lighting device light comprising both light source light and converter light, for instance the former being blue light, and the latter comprising yellow light, or yellow and red light, or green and red light, or green, yellow and red light, etc. In yet another specific embodiment, the lighting device is configured to provide only lighting device light comprising only converter light. This may for instance happen (especially in transmissive mode) when light source light irradiating the light converter only leaves the downstream side of the light converter as converted light (i.e. all light source light penetrating into the light converter is absorbed by the light converter).

The term "light converter" may also relate to a plurality of light converters. These can be arranged downstream of one another, but may also be arranged adjacent to each other (optionally also even in physical contact as directly neighboring light converters). The plurality of light converters may comprise in an embodiment two or more subsets which have different optical properties. For instance, one or more subsets may be configured to generate light converter light with a first spectral light distribution, like green light, and one or more subsets may be configured to generate light converter light with a second spectral light distribution, like red light. More than two or more subsets may be applied. When applying different subsets having different optical properties, e.g. white light may be provided and/or the color of the device light (i.e. the converter light and optional remaining light source light (remaining downstream of the light converter). Especially when a plurality of light sources is applied, of which two or more subsets may be individually controlled, which are radiationally coupled with the two or more light converter subsets with different optical properties, the color of the device light may be tunable. Other options to make white light are also possible (see also below).

As indicated above, the light converter in general essentially comprises the polymeric host material and the light converter nanoparticles.

The phrase "wherein the polymeric host material is based on radical polymerizable monomers", may especially indicate that the polymer host material is obtainable by reaction monomers that are able to form polymers by radical polymerization. A non-limiting number of examples of such polymers are mentioned below, and the person skilled in the art may derive therefrom which monomers (i.e. monomer precursors) may be used (see further also below). Such monomer thus especially includes one or more radical-polamerizable groups (which may be used for polymeriation with a photo initiator upon irradiation). Such monomers may in an embodiment include different type of monomers.

As can for instance be derived from WO 03/093328, examples of monomers polymerizable by a free radical polymerization process include, but are not limited to, alpha-olefins; dienes such as butadiene and chloroprene; styrene, alpha-methyl styrene, and the like; heteroatom substituted alpha-olefins, for example, vinyl acetate, vinyl alkyl ethers for example, ethyl vinyl ether, vinyltrimethylsilane, vinyl chloride, tetrafluoroethylene, chlorotrifluoroethylene, N-(3-dimethylaminopropyl methacrylamide, dimethylaminopropyl methacrylamide, acrylamide, methacrylamide, and similar derivatives; acrylic acids and derivatives for example, acrylic acid, methacrylic acid, crotonic acid, acrylonitrile, acrylic esters substituted with methoxy, ethoxy, propoxy, butoxy, and similar derivatives for example, methyl acrylate, propyl acrylate, butyl acrylate, methyl methacrylate, methyl crotonate, glycidyl methacrylate, alkyl crotonates, and related esters; cyclic and polycyclic olefin compounds for example, cyclopentene, cyclohexene, cycloheptene, cyclooctene, and cyclic derivatives up to $C_{20}$; polycyclic derivates for example, norbornene, and similar derivatives up to $C_{20}$; cyclic vinyl ethers for example, 2,3-dihydrofuran, 3,4-dihydropyran, and similar derivatives; allylic alcohol derivatives for example, vinylethylene carbonate, disubstituted olefins such as maleic and fumaric compounds for example, maleic anhydride, diethylfumarate, and the like; and mixtures thereof.

As can be derived from e.g. WO 2011/031871, additional examples of monomers include, but are not limited to, allyl methacrylate, benzyl methyl acrylate, 1,3-butanediol dimethacrylate, 1,4-butanediol dimethacrylate, butyl acrylate, n-butyl methacrylate, ethyl methacrylate, 2-ethyl hexyl acrylate, 1,6-hexanediol dimethacrylate, 4-hydroxybutyl acrylate, hydroxyethyl acrylate, 2-hydroxyethyl methacrylate, 2-hydroxypropyl acrylate, isobutyl methacrylate, lauryl methacrylate, methacrylic acid, methyl acrylate, 2,2,3,3,4,4,5,5-octafluoropentyl acrylate, pentaerythritol triacrylate, 2,2,2-trifluoroethyl 2-methyl acrylate, trimethylolpropane triacrylate, acrylamide n,n,-methylene-bisacryl-amide phenyl acrylate, and divinyl benzene.

Many of these types of monomers are acrylate systems. Hence, the term "acrylate" may refer to any of those above mentioned systems such as acrylate, meth(yl)acrylate, butyl acrylate, lauryl methacrylate, etc. etc. Likewise, vinyl monomer may refer to any monomer comprising a vinyl group.

The phrase "wherein the polymeric host material is based on radical polymerizable monomers" does not exclude the presence of e.g. cross-linkers in the monomeric starting material. In contrast, especially the polymeric host material comprises cross-linked polymers. This may provide a more stable light converter. For the synthesis of the light converter, see below.

In principle, the polymer obtained may be any polymer, such as a linear polymer, a (hyper)branched polymer, a cross-linked polymer, a star polymer, a dendrimer, a random copolymer, an alternating copolymer, a graft copolymer, a block copolymer, and a terpolymer. The polymeric host material may in an embodiment be or comprise a resin.

Especially those radical polymerizable monomers are applied, which lead to a light transmissive polymer. In the embodiment of the invention, the (light transmissive polymer) is a polymer which shows high light transmission. Preferably a mean absorption of less than 5%/mm more preferentially less than 2%/mm, especially less than 1%/mm (per mm polymer thickness) in the wavelength region 400-700 nm. Hence, in an embodiment the first polymer is a polymer having an absorption of less than 5%/mm, more preferentially less than 2%/mm and most preferentially less than 1%/mm in the wavelength range of 400-700 nm. Note that the transmission and absorption of the polymer is related to the polymer per se, i.e. the polymeric host material, and not to the transmission of the light converter (i.e. including the light converter nanoparticles). Especially, the maximum absorption (of the first polymer) is less than 20%/mm, even more especially less than 10%/mm, over the entire wavelength region 400-700 nm. Transmission (T) and absorption (A) relate as A=1−To/Ti, wherein Ti the intensity of the visible light impinging on the item (such as the first polymer or the converter) and To being is the intensity of the light escaping at the other side of the item. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). Herein, transmissive ma relate to transparent and to translucent.

As can e.g. be derived from WO 2011/031871, examples of polymers, for example and without limitation, are polyethylene, polypropylene, polystyrene, polyethylene oxide, polysiloxane, polyphenylene, polythiophene, poly(phenylene-vinylene), polysilane, polyethylene terephthalate and poly(phenylene-ethynylene), polymethylmethacrylate, polylaurylmethacrylate, polycarbonate, epoxy, and other epoxies. Similar as what has been said with respect to monomers, some of these types of polymers are acrylate systems. Hence, the term "polyacrylate" may refer to any of those above mentioned systems such as polyacrylate, polymeth(yl)acrylate, polybutyl acrylate, polylauryl methacrylate, etc. etc. Likewise, vinylpolymer may refer to any polymer based on monomers comprising a vinyl group, such as polyethylene, polyprolylene, etc. etc.

In view of light transmission and/or chemical stability and/or production process considerations, especially the polymeric host material is selected from the group consisting of a poly vinyl polymer (such as a poly ethylene, a poly propylene, etc.), a poly acrylate polymer (such as a poly acrylate, a poly methacrylate, a poly laurylmethacrylate, etc.) and a thiol-ene polymer (such as polythiophene).

Especially, the polymeric host material is selected from the group consisting of polyacrylate, polymeth(yl)acrylate, polybutyl acrylate, polylauryl methacrylate. Hence, in yet a further specific embodiment, the polymeric host material is selected from the group consisting of polyacrylate, polymeth(yl)acrylate, polybutyl acrylate, polylauryl methacrylate, and the polymeric host material comprises cross-linked polymers (i.e. one or more of the afore-mentioned polymers are cross-linked polymers).

In some embodiments, though not exclusively, the device is configured in such a way and the polymeric host material is chosen (designed) in such a way that during operation of the device, the temperature of the light converter is below the glass temperature (Tg) of the polymer of the polymeric host material, especially at least 10° C. below the glass temperature. However, other systems wherein above condition is not fulfilled may also be chosen. For instance, polymeric host material may have a glass temperature of 130° C. and an application temperature of 120° C. To increase the glass temperature, a cross-linker may be included in the starting mixture.

Polymers obtained with low concentration of initiator may have high molecular weight, and therefore have long chains with reduced mobility. This may restrict light converter nanoparticles from migrating in the polymer film and forming aggregates with red-shifted emission, lower quantum yield (QY) and fast decaying photo luminescence (PL). Longer polymer molecules also ensure a higher glass transition temperature of the polymer, conferring it stability over a larger temperature interval.

The term "radical initiator based material" refers to the remains of the radical initiator that can be found or evaluation from the composition of the polymeric host material. This radical initiator based material may include unreacted radical initiator, but also radical initiator that has been reacted. In case radical initiator has been consumed, it refers to groups in the polymeric host material that originate from the radical initiator. Assuming that the starting materials for the polymeric host material only comprises radical polymerizable monomers, and relative to the total amount of radical polymerizable monomers 1 ppm radical initiator is added, the amount of radical initiator based material in the polymeric host material may also be 1 ppm. The term "radical initiator" may in an embodiment refer to a plurality of different radical initiators.

The free radical polymerization process is well known and involves a reaction initiated by the formation of a free radical from a free radical generator, for example a peroxide or azo initiator. A reaction is initiated by addition of the free radical to an unsaturated monomer molecule that subsequently adds, in a step-wise manner, to additional unsaturated monomers to form a growing chain or polymer.

As can e.g. be derived from WO 03/093328, examples of free radical initiators include, but are not limited to, the following: organic peroxides like: t-alkyl peroxyesters, tert-butyl peroxybenzoate, tert-butyl peroxyacetate, ter-butyl peroxypivalate, tert-butyl peroxymaleate, monoperoxycarbonates, OO-tert-butyl O-isopropyl monoperoxycarbonate, diperoxyketals, ethyl 3,3-di-(tert-amylperoxy)-butyrate, n-butyl-4,4-di(tertbutylperoxy)-valerate, 1,1-di(tert-butylperoxy)-cyclohexane, 1,1-di(tert-amylperoxy)-cyclohexane, dialkyl peroxides, 2,5-di(tert-butylperoxy)-2,5-dimethyl-3-hexyne, 2,5-di(tert-butylperoxy)-2,5-dimethylhexane, di-tert-amyl peroxide, di-tert-butyl peroxide, dicumyl peroxide, t-alkyl hydroperoxides, tert-butyl hydroperoxide, teramyl hydroperoxide, alpha-cumyl hydroperoxide, ketone peroxides, methyl ethyl ketone peroxide, cyclohexanone peroxide, 2,4-pentanedione peroxide, isobutyryl peroxide, isopropyl peroxydicarbonate, di-n-butyl peroxydicarbonate, di-sec-butyl peroxydicarbonate, tert-butyl perneodecanoate, dioctanoyl peroxide, didecanoyl peroxide, diproprionyl peroxide, didecanoyl peroxide, dipropionyl peroxide, dilauroyl peroxide, tert-butyl perisobutyrate, tert-butyl peracetate, tert-butyl per-,5,5-trimethyl hexanoate; azo compounds like: 2,2'-azobis[4-methoxy-2,4-dimethyl]pentanenitrile, 2,3'-azobis[2,4-dimethyl]pentanenitrile, 2,2'-azobis [isobutyronitrile]; carbon-carbon initiators like: 2,3-dimethyl-2,3-diphenylbutane, 3,4-dimethyl-3,4-diphenylhexane, 1,1,2,2-tetraphenyl-1,2-bis(trimethylsiloxy) ethane; inorganic peroxides like: hydrogen peroxide, potassium peroxydisulfate; photoinitiators like: benzophenone 4-phenylbenzophenone, xanthone thioxanthone, 2-chlorothioxanthone, 4,4'-bis (N, N'-dimethylamino benzophenone), benzyl, 9,10-phenanthraquinone, 9,10-anthraquinone, alpha,alpha-dimethyl-alpha-hydroxyacetophenone, (1-hydroxycyclohexyl)-phenylmethanone, benzoin ethers, like methyl, ethyl, isobutyl, benzoin ethers, alpha,alpha-dimethoxy-alpha-phenylacetophenone, 1-phenyl-1,2-propanedione, 2-(O-benzoyl)oxime, diphenyl(2,4,6-trimethylbenzoyl)phosphineoxide, alpha-dimethylamino-alpha-ethyl-alpha-benzyl-3,5-dimethyl-4-morpholinoacetophenone, etc.

As can for instance be derived from WO 2011/031871, there are in general two classes of photoinitiators. In the first class, the chemical undergoes unimolecular bond cleavage to yield free radicals. Examples of such photoinitiators include benzoin ethers, benzyl ketals, a-dialkoxy-acetophenones, a-amino-alkylphenones, and acylphosphine oxides. The second class of photoinitiators is characterized by a bimolecular reaction where the photo initiator reacts with a co-initiator to form free radicals. Examples of such are benzophenones/amines, thioxanthones/amines, and titanocenes (visible light). A non-exhaustive listing of specific examples of photoinitiators that may be useful with a photo-polymerizable monomer for particle preparation include the following from CIBA: IRGACURE 184 (1-hydroxy-cyclohexyl-phenyl-ketone), DAROCUR 1173 (2-hydroxy-2-methyl-1-phenyl-1-propanone), IRGACURE 2959 (2-hydroxy-1-[4-(2-hydroxyethoxy)-phenyl]-2-methyl-1-propanone), DAROCUR MBF (Methylbenzoylformate), IRGACURE 754 (oxy-phenyl-acetic acid 2-[2 oxo-2 phenyl-acetoxy-ethoxy]-ethyl ester and oxy-phenyl-acetic 2-[2-hydroxy-ethoxy]-ethyl ester), IRGACURE 651 Alpha, (alpha-dimethoxy-alpha-phenylacetophenone), IRGACURE 369 (2-Benzyl-2-(dimethylamino)-1-[4-(4-morpholinyl)-phenyl]-1-butanone), IRGACURE 907 (2-methyl-1-[4-(methylthio)phenyl]-2-(4-morpholinyl)-1-propanone), DAROCUR TPO (diphenyl(2,4,6-trimethylbenzoyl)phosphine oxide), IRGACURE 819 (phosphine oxide, phenyl bis (BAPO) (2,4,6-trimethyl benzoyl)), IRGACURE 784 (bis (eta 5-2,4-cyclopentadien-1-yl)Bis[2,6-difluoro-3-(1H-pyrrol-1-yl)-phenyl]titanium), IRGACURE 250 (iodonium,(4-methylphenyl)[4-(2-methylpropyl)phenyl]-hexafluorophosphate(1-).) Hence, the polymeric host material may contain radical initiator based material, for instance in an amount of 0.01-5 wt. %, such as −0.1-2 wt. % (relative to the total weight of the polymeric host material). Therefore, especially the radical initiator is a photo initiator. It may be that the radical initiator, and especially the photo initiator, may not only be beneficial in the formation of the polymeric host, but also in the formation of the nanoparticles (in situ, when precursors of nanoparticles are applied). The term "radical initiator" may also relate to a plurality of different of radical initiators.

The term "dimensions" especially relate to one or more of length, width, and diameter, dependent upon the shape of the nanoparticles.

A combination of different types of particles may also be applied. Here, the term "different types" may relate to different geometries as well as to different types of luminescent material. Hence, a combination of two or more of (the above indicated) quantum dots or luminescent nanoparticles may also be applied. In an embodiment, different type of Ag nanoparticles are applied, for instance nanoparticles with a bimodal or higher modal particle size distribution. This may lead to a broader emission spectrum and/or an emission spectrum with distinguishable maxima. However, in an embodiment, next to Ag nanoparticles, also other type of noble metal nano particles may be present. In yet a further embodiment, two or more different type of noble metals are present as nano particles in the light converter. In yet another embodiment, next to noble metal based nanoparticles, such as Ag nanoparticles, also other type of nanoparticles may be present like, semiconductor based nano particles. Especially, such (additional) nano particles are selected from the group consisting of CdS, CdSe, CdSe/CdS and CdSe/CdS/ZnS nanoparticles.

As indicated above, especially, the light converter may comprise 0.001-10 wt. % light converter nanoparticles (light converter metal nano clusters) relative to the total weight of the light converter, such as 0.1-10 wt. %, especially not more than 5 wt. %.

In an embodiment, nanoparticles preferably have ligands attached thereto, such as e.g. described in WO 2011/031871. In an embodiment, the ligands can be derived from the coordinating solvent used during the growth process. In an embodiment, the surface can be modified by repeated exposure to an excess of a competing coordinating group to form an overlayer.

For example, a dispersion of the capped semiconductor nanoparticle can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanoparticle, including, for example, phosphines, thiols, amines and phosphates. The semiconductor nanoparticle can be exposed to short chain polymers which exhibit an affinity for the surface and which terminate in a moiety having an affinity for a liquid medium in which the semiconductor nanoparticle is suspended or dispersed. Such affinity improves the stability of the suspension and discourages flocculation of the semiconductor nanoparticle. As ligand, especially an amine may be used. Hence, the starting mixture (see below) may comprise amine group containing molecules that can function as ligand to the noble metal nano particles.

Especially, the ligands may be added as stabilizer (or stabilizing agent) during production of the light converter (see also below). As will be clear to a person skilled in the art, a combination of different types of ligands may be applied.

In an embodiment, the light converter can optionally further be provided with a cover, coating or layer for protection from the environment (e.g., dust, moisture, and the like) and/or scratching or abrasion. Hence, in an embodiment the light converter is enclosed by an encapsulation.

Especially, the light converter is enclosed by an encapsulate or encapsulation. As used herein, "encapsulation" may refer to protection against a particular element or compound, for example, oxygen ($O_2$)(such as in the form of air) and/or water. In an embodiment, encapsulation can be complete (also referred to herein as full encapsulation).

In an embodiment, encapsulation can be less than complete (also referred to herein as partial encapsulation). Hence, in an embodiment, the optical material is at least partially encapsulated. Therefore, in an embodiment the optical material is at least partially encapsulated by a barrier material. Especially, in an embodiment the optical material is at least partially encapsulated by a material that is substantially impervious to oxygen. In an embodiment, the optical material is at least partially encapsulated by a material that is substantially impervious to moisture (e.g. water). In an embodiment, the optical material is at least partially encapsulated by a material that is substantially impervious to air. In an embodiment, the optical material is at least partially encapsulated by a material that is substantially impervious to oxygen and moisture.

In an embodiment, for example, the optical material can be sandwiched between substrates. In an embodiment, one or both of the substrates can comprise glass plates. In an embodiment, for example, the optical material can be sandwiched between a substrate (e.g., a glass plate) and a barrier film. In an embodiment, the optical material can be sandwiched between two barrier films or coatings.

In an embodiment, the optical material is fully encapsulated. In an embodiment, for example, the optical material can be sandwiched between substrates (e.g., glass plates) that are encapsulated by a perimeter encapsulation. In an embodiment, for example, the optical material can be disposed on a substrate (e.g., a glass support) and fully covered by barrier film. In an embodiment, for example, the optical material can be disposed on a substrate (e.g., a glass support) and fully covered by protective coating. In an embodiment, the optical material can be sandwiched between two barrier films or coatings that are encapsulated by a perimeter encapsulation. Examples of suitable barrier films or coatings include, without limitation, a hard metal oxide coating, a thin glass layer, and Barix coating materials available from Vitex Systems, Inc. Other barrier films or coatings can be readily ascertained by a person skilled in the art.

In an embodiment, more than one barrier film or coating can be used to encapsulate the optical material. Hence, also a multi-layer may be applied to form the barrier film or coating, or a multi-layer of barrier films or coatings may be applied to provide the encapsulation.

Especially, the light converter is enclosed by an encapsulation, especially an oxygen non-permeable encapsulation. Hence, the encapsulation is especially configured to block transport of oxygen from the atmosphere into the encapsulated light converter. The encapsulation may comprise different parts. For instance, the encapsulation may comprise two transmissive plates, between which the light converter is sandwiched, and a coating, film, or glue for final enclosing the edges of the light converter.

At least part of the encapsulation is transmissive for light, especially in the visible, and will thereby allow excitation light reach the light converter nano particles and allow emission light therefrom (at least in the visible) escape from the encapsulated light converter.

As will be clear to a person skilled in the art, part of the encapsulation is transmissive for light, especially transmissive for light of the light source and for light generated by the light converter when being irradiated with the light source light (see also above). Especially, the encapsulation should preferably have an oxygen permeability of at most $10 \, E^{-04}$ mL/m$^2$/24 hours, at 10° C. and 85% relative humidity, especially at most $10 \, E^{-05}$ mL/m$^2$/24 hours, at 10° C. and 85% relative humidity. Water permeability should preferably be at most $10 \, E^{-05}$ g/m$^2$/24 hours at 10° C., especially at most $10 \, E^{-6}$ g/m2/24 hours at 10° C. Hence, the light converter unit may especially include a $O_2$ and $H_2O$ non-permeable encapsulation, which encapsulation especially encloses a substantial part of the light converter, even more especially the entire light converter. Hence, the encapsulation may enclose the light converter over its entire perimeter.

It may be advantageous, in view of efficiency and/or stability, to arrange the nano particles, or especially the light converter, at a non-zero distance, such as 0.5-50 mm, like 1-50 mm, from the light source. Hence, in an embodiment, the light converter may be configured at a non-zero distance of the light source. For instance, the light converter, or especially the luminescent material, may be applied to or may be comprised by a window of the lighting unit. In case the light source is configured to provide blue light, the luminescent material may be configured to convert only part of the light source light. The blue light of the light source and the luminescent material light of the light converter nano particles based luminescent material together may in an embodiment provide white lighting unit light. Hence, in an embodiment, the light converter is configured at a non-zero distance from the light source.

Note however that the invention is not limited to applications wherein the distance between the light converter and the light source is non-zero. The invention, and the herein described specific embodiments, may be also applied in other embodiments wherein the light source and light converter are in physical contact. In such instances, the light converter may especially be configured in physical contact with e.g. a LED die. Hence, in another embodiment, the light converter, especially being a light converter film, is configured on at least part of a LED die of a LED. Hence, in such embodiment the distance between the light converter and the light source is zero.

In yet a further aspect, the invention provides a method for the production of a light converter, the light converter comprising a polymeric host material with light converter nanoparticles (i.e. light converter metal nano clusters) embedded in the polymeric host material ("matrix"), the method comprising (a) providing a mixture comprising (i) radical polymerizable monomers, (ii) light converter nanoparticles or precursors thereof, (iii) a radical initiator, and (iv) optionally one or more of a cross-linker and a stabilizing agent (especially at least the cross-linker, and even more especially both the cross-linker and stabilizing agent); and (b) polymerizing the radical polymerizable monomers, thereby providing the polymeric host material with light converter nanoparticles (light converter metal nano clusters) embedded in the polymeric host material.

In this way, the light converter as further defined above may be obtained. Especially, the method further includes enclosing the thus obtained light converter by an encapsulation (see also above).

Also other species (in addition to the monomers and the light converter nanoparticles) may be present in the starting mixture and may be incorporated in the polymeric host material. For instance, reflective particles like $TiO_2$ particles may also be incorporated. Also inorganic luminescent material, not having nanoparticle character, like micron sized particulate inorganic luminescent materials may be present, as well as the above indicated cross-linker Information about the monomers and the light converter nanoparticles, as well as about the optional radical initiator, are indicated above. As can also be derived from the above, the mixture may comprise 0.001-25 wt. % light converter nanoparticles relative to the total weight of the mixture.

Especially, the radical polymerizable monomers are selected from the group consisting of a vinyl monomer, an acrylate monomer, and a combination of a thiol and a diene.

The amount of radical initiator is here related to the weight of the polymeric host material. When a radical initiator is applied, especially a photo initiator is applied. Especially, the starting mixture contains amount 0.01-5 wt. %, such as –0.1-2 wt. % of 1-1000 ppm radical initiator relative to the total weight of the polymeric host material (that is produced with the method). Especially, when starting with such amounts of radical initiator (photo initiator), good results may be obtained in terms of polymerization (with relative high wavelength radiation) and stability of the nanoparticles (QDs) and/or light converter. Even more especially, the molar amount of radical initiator is equal to or larger than the molar amount of noble metal, especially the molar amount of radical initiator is larger than the molar amount of noble metal, such as a molar ratio of at least 1.1:1 or larger, like 1.2:1 or larger.

The polymerization may be started by heating and or irradiating the radical polymerizable polymers, especially may be started by (at least) irradiating the radical polymerizable monomers. Especially, polymerization may be initiated photo chemically upon irradiation with high energetic rays such as UV, X-rays, gamma rays, electrons. If in the substantial absence of radical (photo)initiator the polymerization may be started by (e.g. UV) irradiation of the mixture (including the radical polymerizable monomers). In some cases it may be desirable to heat up the mixture above the glass transition of the system in order to reach complete polymerization. When polymerization starts, the temperature may again be lowered below the glass transition temperature; after termination, the thus obtained light converter may in some embodiments be cooled down below the glass transition temperature. However, also other methods may be applied, as will be clear to the person skilled in the art. Especially, during polymerization the temperature will not be higher than the boiling point of the monomer(s) used. Especially, UV radiation may be applied to generate the polymeric host material. In a specific embodiment, "polymerizing the radical polymerizable monomers" includes curing the mixture with UV light during a time period in the range of 0.1-10 min, like 0.1-6 min, such as especially 0.2-6 min, especially 0.25-6 min, such as 0.25-4 min. Shorter times may not lead to a stable polymeric host material and longer times may lead to less efficient light converters.

As indicated above, especially a cross-linker may be present in the mixture, leading to a cross-linked polymeric matrix. Hence, in an embodiment the mixture comprises a cross-linker; and the polymeric host material comprises cross-linked polymers. Examples of suitable cross-linkers (or cross-linking agents) may be diacrylates and/or dimethacrylates, such as 1,6-hexanedioldiacrylate, 1,6-hexanediol dimethacrylate, tricyclo[5.2.1.02,6]decane-dimethanol diacrylate, etc. One or more of these type of cross-linkers, and optionally or additionally other cross-liners may be applied.

Especially, at least part of the monomers that are used have the functionality of being polymerizable and the functionality of being cross-linkable. The term "cross-linker" may also relate to a plurality of different of cross-linkers.

Further, as indicated above, the radical polymerizable monomers at least comprise acrylate monomers. Further, the mixture may comprise precursors of the nanoparticles, wherein the precursors comprise a noble metal salt, especially a silver salt. Examples of salts are chlorates, nitrates, nitrites, sulphates, sulphites, acetates, halides, such as chlorides, thiols, thioalcoholates, CN, SCN, acetates, such as trifluoracetates, formiates, carbonates, citrates, perchlorates and complex anions, such as hexafluorophosphate. Especially chloride, chlorate, perchlorate, nitrate, hydroxide, complex anions, such as hexafluorophosphate, tetrafluoroborate, sulfate, anions of carbonic acids, such as formiate, acetate, benzoate or citrate, may be applied.

Especially good results are obtained when the noble metal salt comprises a trifluoro acetate (i.e. a noble metal trifluoro acetate, such as silver trifluoro acetate). Combinations of two or more different salts may also be applied. Herein, the term different may refer to different cations (noble metals cations) and/or different anions (same noble metal, but different anion).

Noble metal nano particles may be obtained based on using a noble salt, or a combination of noble salts, such as noble salt trifluoro acetates. As indicated above, the nanoparticles can be produced in situ or can be provided as ready nanoparticles in the mixture. Would other type of nanoparticles be desired in the matrix, then these are especially provided as ready nanoparticles. For instance ZnS nano particles may be present in the mixture (to be polymerized).

Stabilizers or stabilizing agents are especially species that attach to the nanoparticles as ligands (see also above). This may enhance stability and a smooth distribution of the nanoparticles in the matrix. In an embodiment, the ligands comprise a group that is identical to a monomer that is used to produce the matrix. The term "stabilizer" and similar terms may also relate to a plurality of different stabilizers.

Especially, the amounts, concentrations, chemicals, and reaction conditions are chosen to facilitate formation of noble metal nanoclusters having the herein defined dimensions.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings. The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
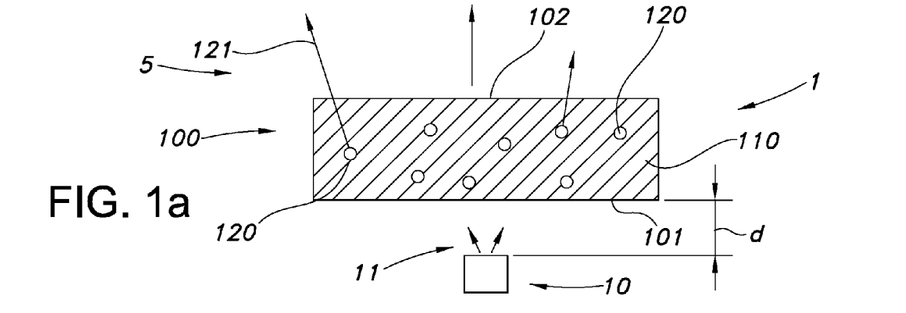
FIGS. 1-1d schematically depict some aspects of the device(s) of the invention. The drawings are not necessarily on scale.

FIG. 1a schematically depicts a lighting device 1 comprising a light source 10 configured to generate light source light 11 and a light converter 100 configured to convert at least part of the light source light 11 into visible converter light 121. Here schematically only one light source 10 is depicted. However, more than one light source 10 may be present.

The light converter has an upstream side 101, which is at least partly directed to the light source 10, and a downstream side, which faces away from the light source 10 (in this transmissive configuration).

The light converter 100 comprises a polymeric host material 110 with light converter nanoparticles 120 (i.e. light converter metal nano clusters, i.e. metal nanoclusters based on noble metals) embedded in the polymeric host material 110. These can be dots, rods, a combination thereof, etc. (see also above). The light converter nanoparticles 120 generate upon excitation by the light source light 11 visible converter light (and optionally also non-visible radiation, like IR radiation). At least part form the converter light 121 escapes from the downstream side 102 as lighting device light 5. This lighting device light 5, of which at least part is in the visible, at least contains part of the convert light 121, and may optionally also contain some remaining light source light 11.

FIG. 1a schematically depicts the lighting device in operation.

Figure 1B:
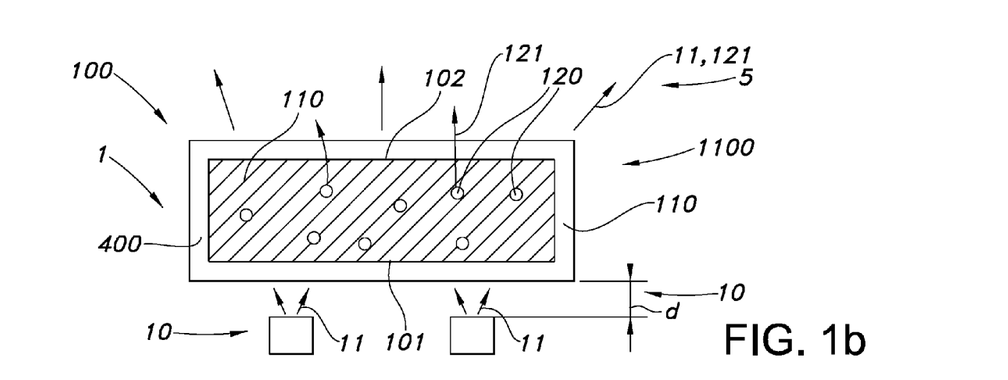

FIG. 1b schematically depicts another embodiment, wherein the light converter 100 is encapsulated. An encapsulation 400 encloses the light converter; this encapsulation may substantially block oxygen (and/or $H_2O$) transporter from the atmosphere to the light converter. This may add to the stability of the light converter nanoparticles 120 (and the polymeric host). The combination of light converter 100 and encapsulation 400 is herein also indicated as light converter unit 1100.

FIGS. 1a-1b by way of example schematically depict embodiments with a non-zero distance d between the light source(s) and the light converter (so-called remote applications). However, in other embodiments the distance d may also be zero.

Figure 1C:
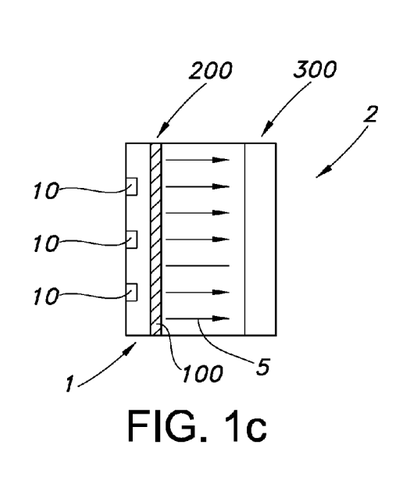

FIG. 1c schematically depicts one of the applications of the lighting unit 1, here in a liquid crystal display device 2, which comprises a back lighting unit 200 which comprises one or more lighting units 1 (here, one lighting unit is schematically depicted), as well as a LCD panel 300, which can be backlighted with the lighting device light 5 of the lighting unit(s) 100 of the back lighting unit 200.

The invention further provides a method of producing the composite involving making a monomeric mixture comprising light converter nanoparticles removing oxygen from the system and then placing the mixture in a confinement and initiating polymerization photo chemically upon irradiation with high energetic rays such as UV, X-rays, gamma rays, electrons.

Optionally, the composite may be used in combination with one or more light converting phosphors for producing white light for illumination. The composite can be used in lighting device for backlighting for LCD.

Figure 1D:
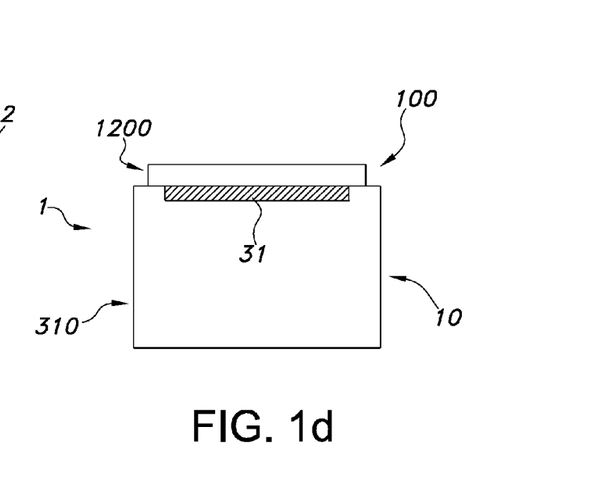

FIG. 1d schematically depicts another embodiment, wherein the lighting device 100 comprises a light source 10, which comprises a (stolid state) LED 310 with LED die 31. The light converter is configured on at least part of this LED die 31, i.e. in physical contact with the LED die 31 (in contrast to the schematically depicted remote configurations in FIGS. 1a-1b). Here, a light converter film 1200 is applied as light converter on the LED die 31. Here the distance between the light source and light converter 100 may be zero.

EXPERIMENTAL

Materials and Definitions

For the metal, silver is used but with different silver salts; silver acetate and silver Trifluoacetate. As for the photo-initiator, Irgacure651 (I651), Irgacure184 (I184) and Benzoin ethyl ether (BEE) were studied. Hexadecylamine (HDA) was used as stabilizer. Two different solvents were tried: Toluene and Tetrahydrofuran (THF).

| | |
|---|---|
| AgAc: silver acetate | OFPMA: octafluoropentyl methacrylate |
| AgTFAc: silver trifluoroacetate | DTMPTA: di(trimethylolpropane) tetraacrylate |
| HDA: hexadecylamine | HDDA: hexanediol diacrylate |
| I184: Irgacure 184 | 1,6-HDDMA: 1,6-hexadioldimethacrylate |
| I651: Irgacure 651 | AgNPs: silver nanoparticles |
| BEE: Benzoin Ethyl ether | LED: light emitting diode |
| THF: Tetrahydrofuran | UV: ultraviolet |
| IBMA: Isobornyl methacrylate | Vis: Visible |
| TDDMDA: trycyclodecanedimethanol diacrylate | FWHM: full width at half maximum |
| IOA: isooctyl acrylate | QY: quantum yield |
| HDFDMA: heptadecafluorodecyl methacrylate | PMA: Phenyl methacrylate |

Process in Solution

Silver salt and the stabilizer are weighted and solvent is added. The solution is stirred and photo-initiator is added. After degassing, the solution remains under argon atmosphere. After that, the solution is put in a quartz cuvette which is totally transparent in the UV-visible area. The cuvette is closed.

Experimental Details:

The absorption and emission measurements are done in parallel in a dark room. A solution with the same composition without silver salt is used as a baseline in order to have the absorption spectrum of silver clusters only. An absorption spectrum is recorded for the sample with no UV exposure in order to see how the spectrum evolves after UV exposure. After each UV exposure, an absorption and fluorescence measurement is done. The wavelength range tested for absorption is 300-800 nm. First an emission spectrum of a highly fluorescent dye is recorded as a reference to make sure the fluorimeter is well calibrated and also to use the same settings in quantitative measurements. For solution measurements, a Coumarin 6 solution was used as a reference. The source used is a high power continuous Xe lamp and the excitation wavelength is 450 nm. The wavelength range tested is 460-800 nm. Every measurement is averaged twice to improve the signal and reduce the noise. For quantum yield measurement, an integrating sphere, a 450 nm laser and a spectrometer was used. The sample is tested in a 1 cm×1 mm×3 cm quartz cuvette. The excitation wavelength is 450 nm. The sample emission range used to calculate the QY is 500 nm-800 nm. The same baseline solution used for the UV-Vis absorption spectroscopy is used in the integrating sphere as a background. Finally, the fluorescence microscopy was done. Two excitation cubes were used: a first cube with the excitation interval 355 nm-425 nm and the emission interval ($\lambda$>470 nm), and a second cube with the excitation interval 515-560 nm and the emission interval ($\lambda$>590 nm).

Influence of UV Irradiation Time

Figure 2A:
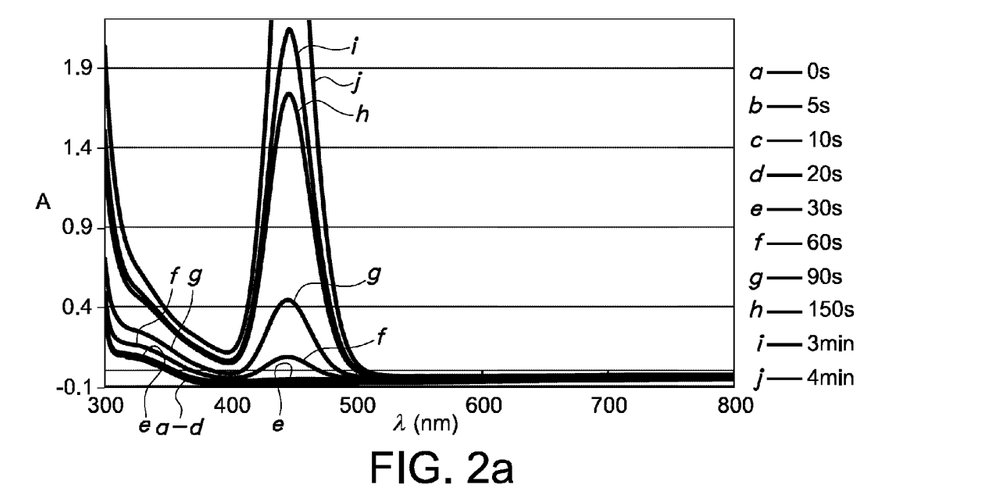
FIG. 2a UV-Vis absorption spectra of a silver nanoparticles solution containing 2 mM of silver trifluoacetate, HDA (hexadecyl amine) and BEE (benzoin ethyl ether) in toluene UV-exposed for different durations.

After a silver nanoparticles solution is prepared, stirred and degassed, absorption and emission are tested for different UV exposure durations. UV-Vis Absorption spectra represented in FIG. 2a correspond to a silver nanoparticles solution containing silver trifluoroacetate, hexadecylamine (HAD) and Benzoin ethyl ether (BEE) in toluene. Those spectra show the evolution of absorption with UV exposure time. Before irradiation, there is no absorbance. The first absorption peak appears after one minute of UV exposure at 446 nm. This peak is increasing with longer UV-exposure. The solution turns yellow after 1 minute of UV. After 4 min of UV irradiation, the absorption goes beyond the reliable dynamic range of the spectrometer. Normally, a plateau is reached once all silver ions or all radicals are consumed.

Figure 2B:
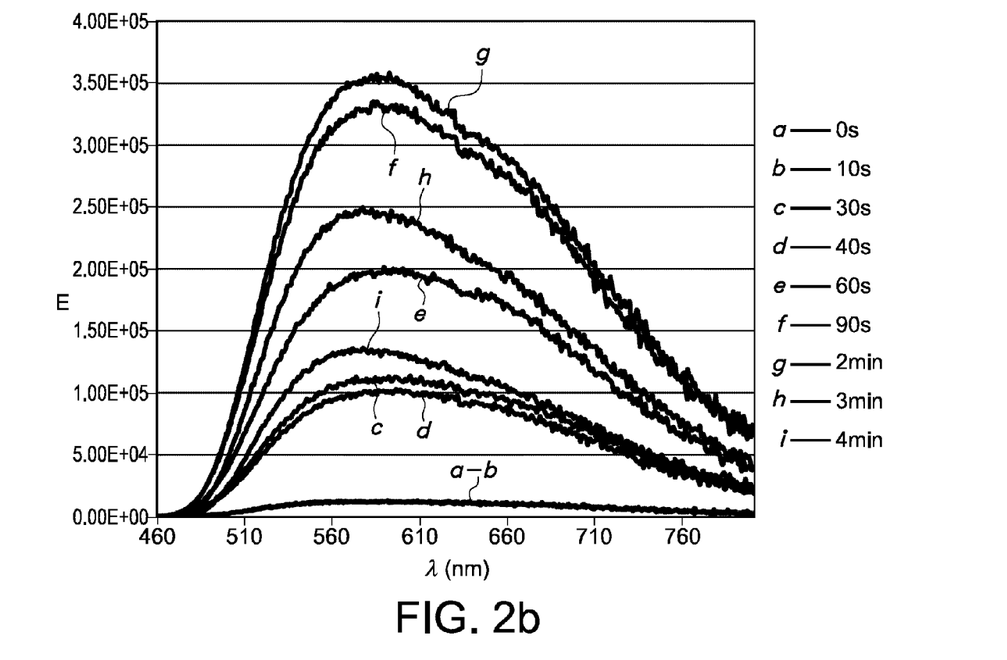
FIG. 2b emission spectra of a silver nanoparticles solution containing 2 mM of silver trifluoacetate, HDA and BEE in toluene exposed for different durations and excited at 450 nm.

Fluorescence of the same solution was tested (FIG. 2b). Before UV irradiation, we have no emission. The first peak appears after 40 s. Unlike absorption, emission reaches an optimum after 2 minutes of UV exposure then starts decreasing. Emission spectra are very broad. The average width at half maximum is 200 nm. The optimal UV exposure time which gives the highest emission may be in the range of 0.1-2 minutes.

Influence of the Photo-Initiator:

Three solutions of silver particles were prepared by mixing 2 mM of Silver trifluoroacetate and hexadecylamine in toluene. After that I184 or I651 or BEE were added to the three solutions respectively. After stirring and degassing, solutions were exposed to UV for 90 seconds. Absorption and fluorescence of the solutions were tested. This experiment revealed that I651 is more suited for photochemical synthesis of fluorescent silver clusters with UV exposure at 365 nm. I651 has a higher absorption, a higher efficiency than I184 or BEE which leads to a higher concentration of fluorescent silver particles produced and thus a higher fluorescence intensity.

Influence of the Silver Salt:

In order to investigate the influence of the silver salt, two AgNPs solutions were prepared, one with silver acetate and the other with silver trifluoroacetate. The rest of the compounds are the same for both solutions; hexadecylamine and I651 in toluene. After stirring and degassing, both solutions were UV exposed for 90 s then their fluorescence was tested. We observed three major differences; the peak corresponding to AgNPs from the silver acetate solution is at 530 nm, it is weak and narrow (FWHM=100 nm) whereas the peak corresponding to AgNPs solution containing initially silver trifluoroacetate is more shifted to the red, at 610 nm, 100 times higher, and two times wider (FWHM=210 nm). Another difference in the two solutions is the color change after UV exposure. The solution containing trifluoroacetate turns light yellow whereas the solution containing silver acetate turns brown.

Influence of the Solvent:

In order to see how the solvent can influence the photonic properties of a AgNPs solution, two AgNPs solutions were prepared, one with toluene and the other with tetrahydrofuran (THF). The composition was similar for both solutions; trifluoroacetate, hexadecylamine and I184. Both solutions were UV-exposed for 3 minutes, and then their absorption and fluorescence were tested.

UV-Vis absorption spectrum corresponding to toluene solution has a high narrow peak at 450 nm whereas the one corresponding to AgNPs solution with THF has a peak at 350 nm. This means that silver particles produced in THF are smaller than those produced in toluene. It is to mention that THF solution turned yellow after 15 minutes of UV exposure. Three major differences are observed between the two spectra. First, the emission peak of the AgNPs solution with toluene is 100 times higher than the one with THF. Second, it is much wider. The full width at half maximum is 220 nm for the solution containing toluene and only 60 nm for the one containing THF. Finally, silver nanoparticles in THF emit at 505 nm whereas in toluene, their emission range is more shifted to the red, around 620 nm. Fluorescence results are in line with absorption results: the peak is higher and more shifted to the red with toluene which leads to conclude that particles formed in toluene are bigger and more than those formed in THF, though also spectral differences in the absorption spectra might contribute to this effect. Solvent choice affects absorption and emission's intensity, wavelength and width. That is known as "the solvent effect". Indeed, solvents can have an effect on solubility of the compounds, stability of the reagents and products and reaction rate. Solvents also can influence the optical properties of silver particles: because of their surface plasmon phenomenon, a changing environment can modify the electron distribution on the clusters surface, leading to a variation of their optical properties.

Characterization of the Optimal Solution

Figure 2C:
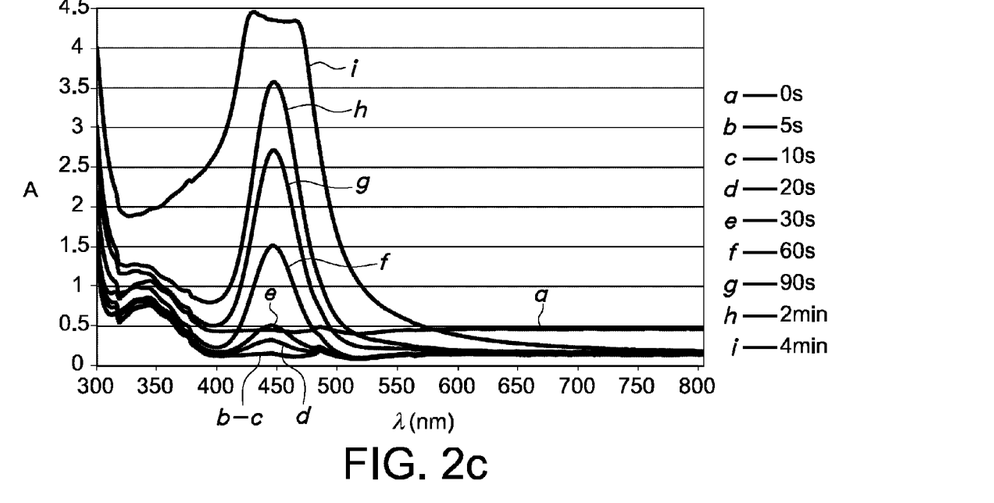
FIG. 2c UV-Vis absorption spectra of a silver nanoparticles solution containing 2 mM of silver trifluoroacetate, HDA and I651 (Irgacure 651) in toluene exposed for different durations.

After testing different silver salts, photo-initiators and solvents, it turns out that the solution with the best results in terms of absorption and fluorescence intensity has the following composition: silver trifluoroacetate, hexadecylamine and I651 in toluene. UV-Vis absorption spectra (FIG. 2c) show absorption at 450 nm after 30 seconds of UV exposure.

Figure 2D:
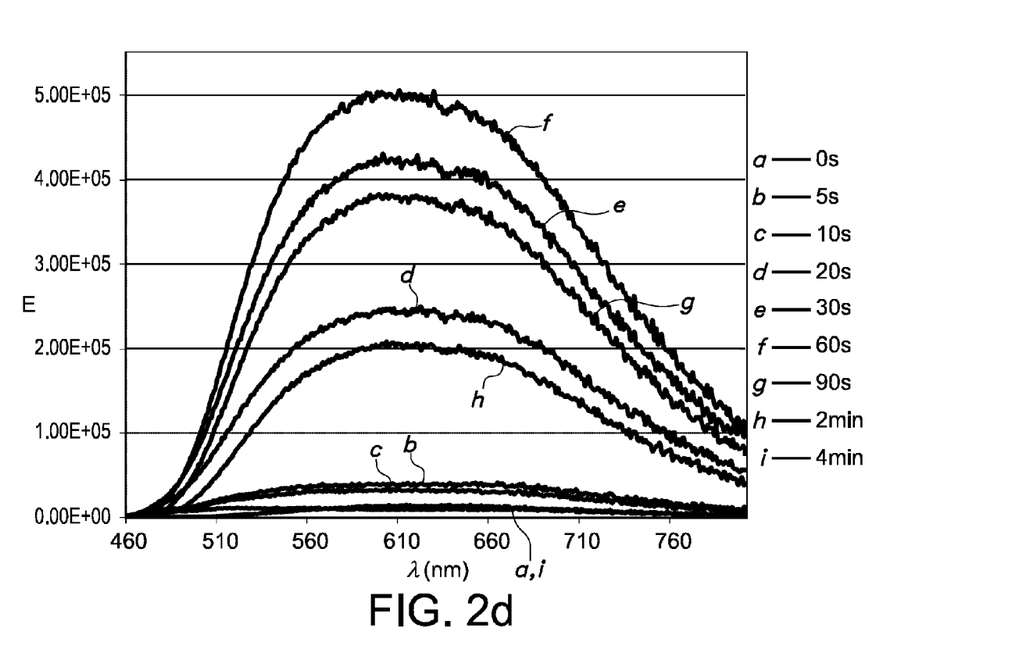
FIG. 2d emission spectra of a silver nanoparticles solution containing 2 mM of silver trifluoroacetate, HDA and I651 in toluene exposed for different durations and excited at 450 nm.

Emission spectra (FIG. 2d) show fluorescence after 20 seconds of UV exposure. The optimal UV exposure time is 60 s because this gives the highest emission intensity. Emission peaks are wide and centered on 610 nm. The solution turned yellow after 1 minute of UV exposure then it got darker with longer UV exposure, probably due to formation of larger non-fluorescent NPs.

The quantum yield of this solution was measured using the integrating sphere. The quantum yield represents the emission efficiency of the solution. It is the ratio of the number of emitted photons to the number of absorbed photons. The highest quantum yield was obtained after 30 seconds of UV irradiation. Beyond 30 seconds, QY starts decreasing until it reaches a plateau after 2 minutes of UV exposure. A transmission electron microscopy was realized on 2 samples of the solution. One sample was exposed for 30 s and the other was exposed for 50 s. In High Angle Annular Dark Field (HAADF) images of nanoparticles, the density of particles in the sample exposed for 50 s (sample 2) is much higher than the density of particles in the one exposed for 30 s (sample 1). Furthermore, the particles size distribution is homogenous in sample 1. All the particles seem to have the same size (1-2 nm) whereas in sample 2 there are particles of different sizes.

The results showed that from the materials we tested, I651, silver trifluoroacetate and toluene are the most suitable materials for making fluorescent silver particles.

Study of the Photochemical Synthesis of Fluorescent Silver Nanoparticles in Monomer Films:

For a possible application as phosphors, highly fluorescent silver clusters with sufficient quantum yield need to be synthesized in polymer cured thin films which can be deposited on top of a blue (or UV) LED or can be arranged remote from a blue (or UV) LED.

The process used for films is the same used for solutions; a photochemical synthesis using a silver salt, a photo-initiator, a stabilizer and a monomer solution instead of the solvent. There is also a new element that wasn't used in solvents: a cross linking agent. It is a monomer which makes chemical links between molecular chains forming a three-dimensional network of connected molecules. The reason for adding this element is to trap silver particles in the network and isolate them in order to prevent aggregation. Another reason is to give mechanical strength to the polymer film, prevent cracks, and ensure a good morphology.

Materials:

Silver trifluoroacetate and I651 were used as silver salt and photo-initiator, respectively. For the monomer, different acrylates were tested including Isobornyl methacrylate (IBMA), trycyclodecanedimethanol diacrylate (TDDMDA) and isooctyl acrylate (IOA). As for the cross linking agent, we also used acrylates like di(trimethylolpropane)tetraacrylate (DTMPTA), 1,6-hexadioldimethacrylate (1,6-HDDMA) and 1,6-hexanediol diacrylate (1,6-HDDA). (See appendix, materials)

Process:

Silver trifluoroacetate and hexadecylamine, monomer solution, and cross linking agent are mixed. I651 is added before the end of stirring. After stirring the solution for 2 hours and degassing it in the vacuum chamber for 15 minutes, comes the UV-curing step. A few droplets of the solution are placed in the middle of the glass square then another glass square with the same dimensions is put on top. Spacers are used in order to have a uniform thickness of the film. Once the UV exposure is over, spacers are taken off and the film is sandwiched between the two glass squares. UV irradiation is used for both polymerization of the monomer and activation of the photo-initiator. UV curing time intervals depend on the monomer used.

For the measurements, the settings stated for testing AgNPs solutions remain the same for films. A film with the same composition without silver salt is prepared to use as a baseline in UV-Vis spectroscopy and quantum yield measurement. A highly fluorescent phosphor film is used as a reference in fluorescence measurement to calibrate the fluorimeter and also to normalize in quantitative measurements. Excitation wavelength is 450 nm.

Influence of UV Curing Time:

We prepared a solution containing TDDMDA, HDDA, silver trifluoroacetate, 1 of hexadecylamine and I651. After that several films were prepared with different UV-curing times then absorption, fluorescence and quantum yield were measured. The optimal UV-curing time is 20 seconds. It is also the minimal duration to cure TDDMDA.

Influence of the Monomer:

In order to investigate the influence of the monomer on the optical properties, silver nanoparticles films were prepared with 5 different monomers, IBMA, TDDMDA, HDFDMA, PMA and OFPMA. DTMPTA was used as a cross linking agent. The rest of the compounds are similar for all the films; silver trifluoroacetate, I651 and hexadecylamine. All the films were UV-cured for 5 minutes. The TDDMDA monomer gives best results in terms of efficiency.

Influence of the Cross-Linking Agent:

Two films were prepared using TDDMDA, silver trifluoroacetate, I651 and hexadecylamine. DTMPTA was used as a cross-linking agent for the first film and HDDA for the second. Both films were cured for 30 seconds. DTMPTA gives a better fluorescence and quantum yield than e.g. HDDA.

Influence of Concentration:

Three films were prepared using TDDMDA and HDDA. The first film contains 2 mM of silver trifluoroacetate, 2 mM of I651 and 2 mM of hexadecylamine. The second and third films contain respectively 5 mM and 10 mM of the same compounds. The three films were UV-cured for 30 seconds. Concentration of the compounds affects directly the spectroscopic properties of fluorescent silver nanoparticles films. Increasing the concentration of the silver salt and the photo-initiator leads to a higher density but also bigger size of silver particles. This might increase the emission intensity if silver particles don't grow beyond the critical diameter (2-3 nm). 0.035-0.045 wt. % turns out to be the best concentration in terms of quantum yield.

Figure 2E:
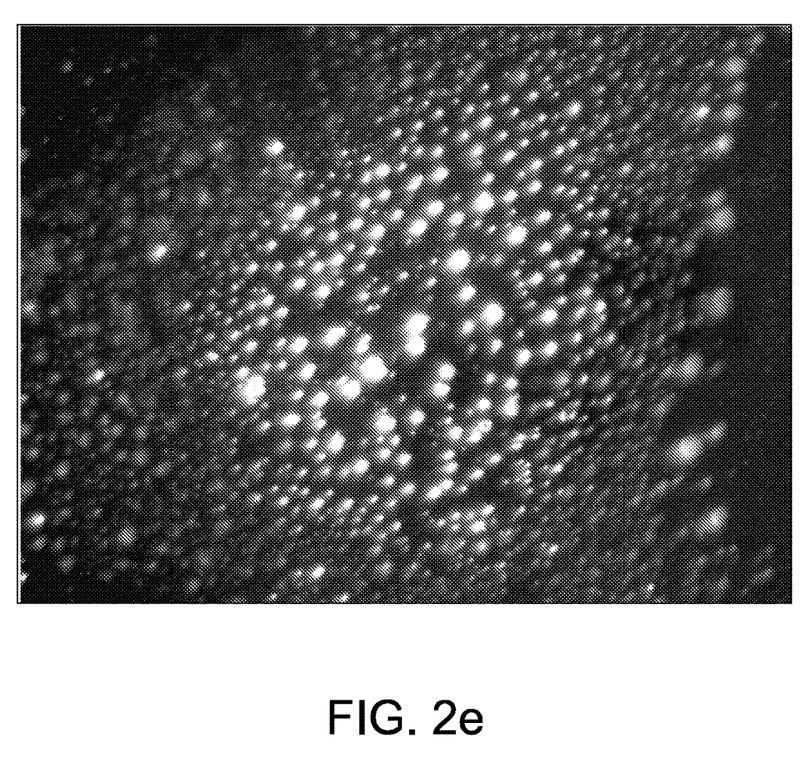
FIG. 2e fluorescence microscopy of a film containing Ag nanoclusters photochemically synthesized in situ: emission>470 nm.
Figure 3:
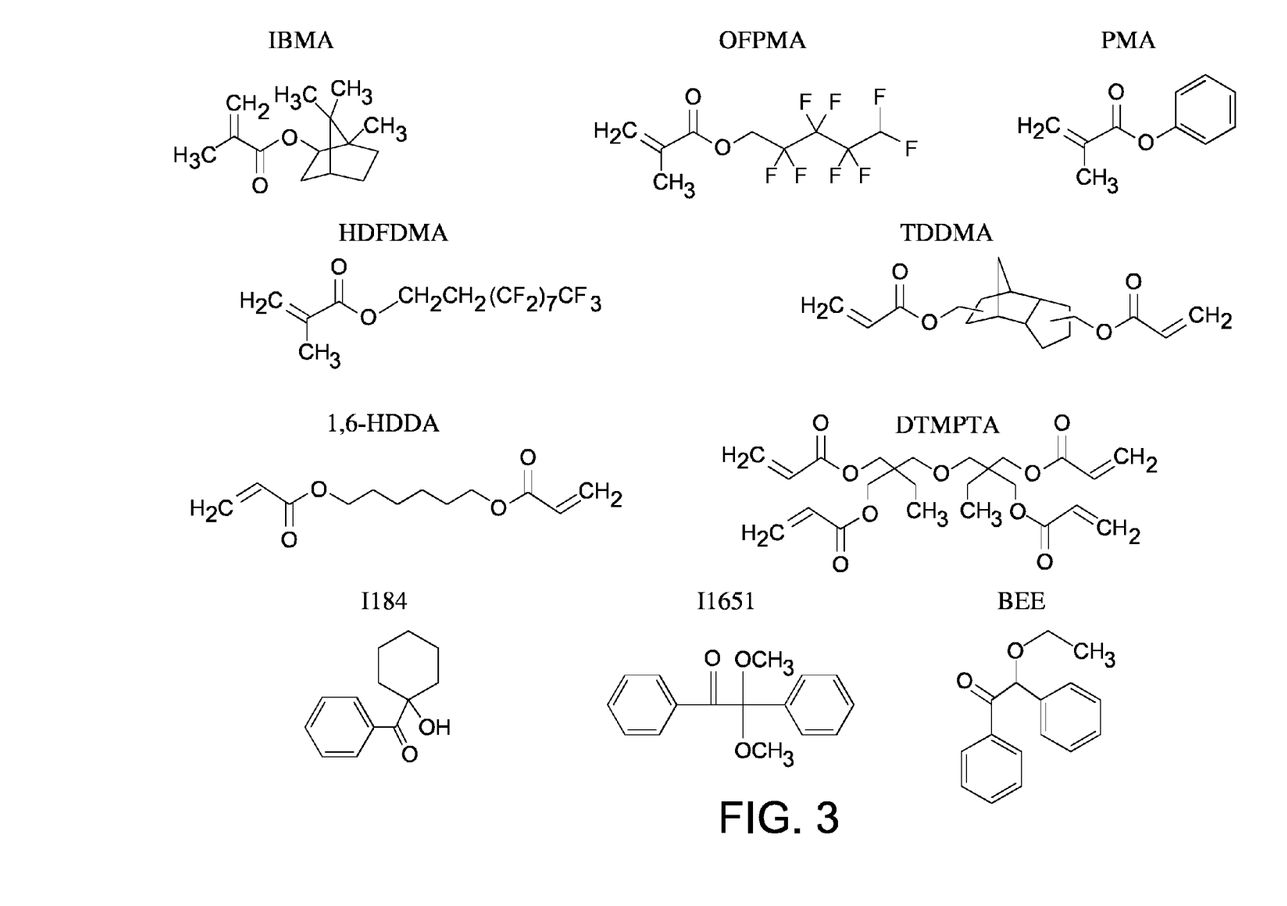
FIG. 3 depicts some chemicals used.

Characteristics of the Optimal Composition:

After comparing different materials and concentrations, it turns out that the best composition in terms of quantum yield is TDDMDA, DTMPTA, silver trifluoroacetate, I651 and hexadecylamine. In addition of absorption, fluorescence and quantum yield measurements, a fluorescence microscopy was done on a sample to see the emission range. A sample UV-exposed for 40 seconds was tested with fluorescence microscopy. First, the sample was observed using an excitation cube filter with the excitation interval [355 nm; 425 nm] and the emission interval ($\lambda$>470 nm) (FIG. 2e). A white emission is observed. This confirms the wide emission peaks obtained during the fluorescence test. Particles have different sizes and thus emit different colors which are combined and seen as a white emission. Some areas are also brighter than others. This could be because of a non-uniform density of particles in the film.

A fluorescence excited state lifetime measurement was done for a sample with the optimal composition, UV-exposed for 40 seconds. It revealed that the decay fits a bi-exponential function with a brief lifetime $\tau1$=1.42 ns and a slower lifetime $\tau2$=6.45 ns. The fact that we have two different lifetimes might refer to the existence of two types of silver nanoparticles. The brief lifetime probably corresponds to particles with singlet transition whereas the longer lifetime corresponds to particles with singlet-triplet interband transition. Indeed, in case of singlet transition, the excited electron is still paired with the ground state electron (anti-parallel spins). For this reason, the emission is quick (brief lifetime). One the other hand, for triplet transition, the excited electron is no longer paired with the ground electron (parallel spins) and thus, the emission requires an additional transition where the spin is reversed. This might be the reason why the lifetime is longer in this case. An excellent fit was obtained: $\chi2$=1,242.

Stability Test:

A fluorescent film was prepared by UV-curing for 30 seconds a silver nanoparticles solution containing TDDMDA, DTMPTA, silver trifluoroacetate, I651 and hexadecylamine. Absorption, fluorescence and QY were tested every day for 20 days. Emission spectra recorded with the fluorimeter highlight the existence of three major phases. The first phase is the increase of fluorescence intensity during the first 24 hours. This is in line with the increasing absorption during the same period and may confirm the formation of fluorescent silver clusters all along the first 24 hours. The second phase is the decrease of fluorescence intensity between the 24 hours and 72 hours. The third phase is after 3 days. The emission intensity reaches a plateau. The system reaches equilibrium and fluorescence doesn't evolve anymore.

The same phases can be observed in the quantum yield evolution. First the quantum yield is more or less stable because both fluorescence and absorption increase with the formation of new fluorescent silver clusters. Then the quantum yield starts decreasing because fluorescence decreases whereas absorption remains steady. Finally equilibrium is reached and QY reaches a plateau: the system becomes stable.

The invention claimed is:

1. A lighting device comprising:
   a light source configured to generate light source light; and
   a light converter configured to convert at least part of the light source light into visible converter light, wherein the light converter comprises a polymeric host material with light converter nanoparticles directly embedded in the polymeric host material, wherein the polymeric host material is based on radical polymerizable monomers, wherein the polymeric host material comprises a poly acrylate polymer and wherein the light converter nanoparticles comprise silver nanoparticles having mean dimensions below 3 nm.

2. The lighting device according to claim 1, wherein the polymeric host material contains radical initiator based material.

3. The lighting device according to claim 1, wherein the polymeric host material is selected from the group consisting of polyacrylate, polymeth(yl)acrylate, polybutyl acrylate, and polylauryl methacrylate.

4. The lighting device according to claim 1, wherein the polymeric host material comprises cross-linked polymers.

5. The lighting device according to claim 1, wherein the light converter nanoparticles comprise silver nanoparticles having mean dimensions below 2.5 nm, and wherein the light converter comprises 0.001-10 wt. % light converter nanoparticles relative to the total weight of the light converter.

6. The lighting device according to claim 1, wherein the light converter is a light converter film configured on at least part of a LED die of a LED.

7. A liquid crystal display device comprising a back lighting unit, wherein the back lighting unit comprises one or more lighting devices according to claim 1.

8. The lighting device according to claim 1, wherein the light source is a LED die and the light converter is a film that is larger than the LED die.

9. A light converter comprising a polymeric host material with light converter nanoparticles directly embedded in the polymeric host material, wherein the polymeric host material is based on radical polymerizable monomers, wherein the polymeric host material comprises a poly acrylate polymer and wherein the light converter nanoparticles comprise silver nanoparticles having mean dimensions below 3 nm.

10. The light converter according to claim 9, wherein the polymeric host material is selected from the group consisting of polyacrylate, polymeth(yl)acrylate, polybutyl acrylate, and polylauryl methacrylate, and wherein the polymeric host material comprises cross- linked polymers, wherein the light converter nanoparticles comprise silver nanoparticles having mean dimensions below 2.5 nm, and wherein the light converter comprises 0.001-25 wt. % light converter nanoparticles relative to the total weight of the light converter.

11. A method for the production of a light converter, the light converter comprising a polymeric host material and light converter nanoparticles directly embedded in the polymeric host material, the method comprising:
   providing a mixture comprising radical polymerizable monomers, light converter nanoparticles or precursors thereof, a radical initiator, and optionally one or more of a cross-linker and a stabilizing agent; and
   polymerizing the radical polymerizable monomers, thereby providing a film comprising the polymeric host material and the light converter nanoparticles directly embedded and dispersed in the polymeric host material, wherein the film is larger than a LED die and the light converter nanoparticles comprise noble metal nanoclusters having mean dimensions below 3 nm.

12. The method according to claim 11, wherein the radical initiator is a photo initiator.

13. The method according to claim 11, wherein the radical polymerizable monomers at least comprise acrylate monomers.

14. The method according to claim 11, wherein the mixture comprises precursors of the nanoparticles, wherein the precursors comprise a silver salt.

15. The method according to claim 14, wherein the silver salt comprises trifluoro acetate.

16. The method according to claim 14, wherein the light converter nanoparticles comprise silver nanoparticles having mean dimensions below 3 nm.

17. The method according to claim 11, wherein polymerizing the radical polymerizable monomers includes curing the mixture with UV light during a time period in the range of 0.1-6 min.

18. The method according to claim 17, wherein polymerizing further comprises placing the mixture between glass plates prior to curing the mixture with UV light.

19. The method according to claim 11, further comprising encapsulating at least part of the film with a glass plate, a barrier film, or a perimeter encapsulation.

20. The method according to claim 11, further comprising configuring the film directly on at least part of the LED die, as a light exit window of a lighting device, or a wall or a light exit window of a light mixing chamber.

* * * * *